Figure 1:
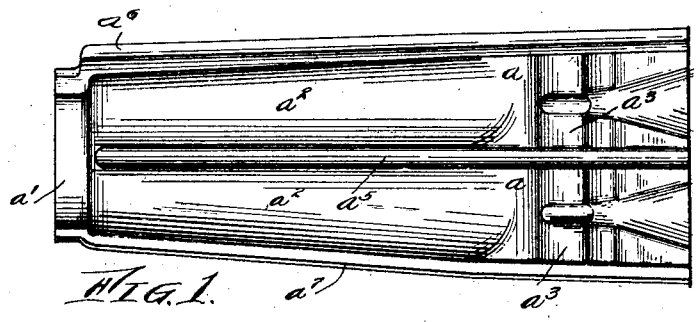

June 10, 1924.

T. N. AIKENS

DIE

Filed Sept. 12, 1921

1,497,006

6 Sheets—Sheet 1

INVENTOR,
Thomas N. Aikens
Thurston, Kwis & Hudson
By
Attys.

June 10, 1924.
T. N. AIKENS
DIE
Filed Sept. 12, 1921
1,497,006
6 Sheets-Sheet 2
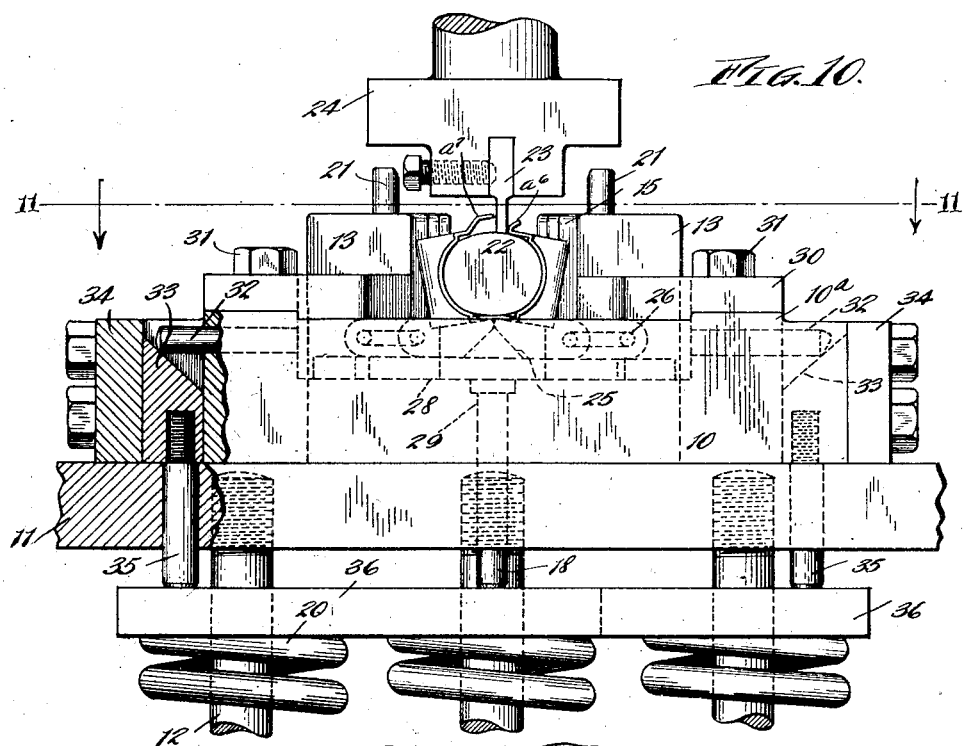
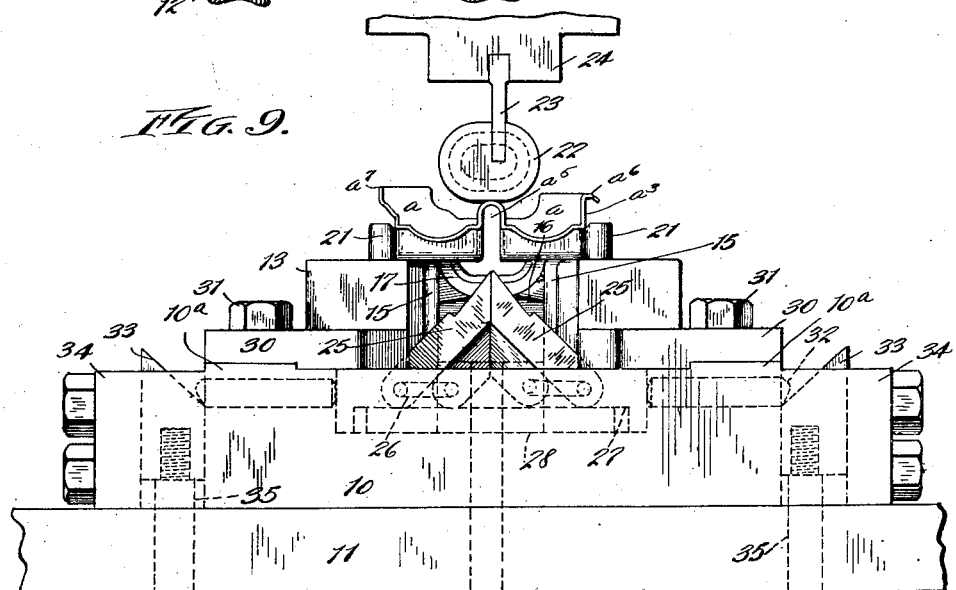

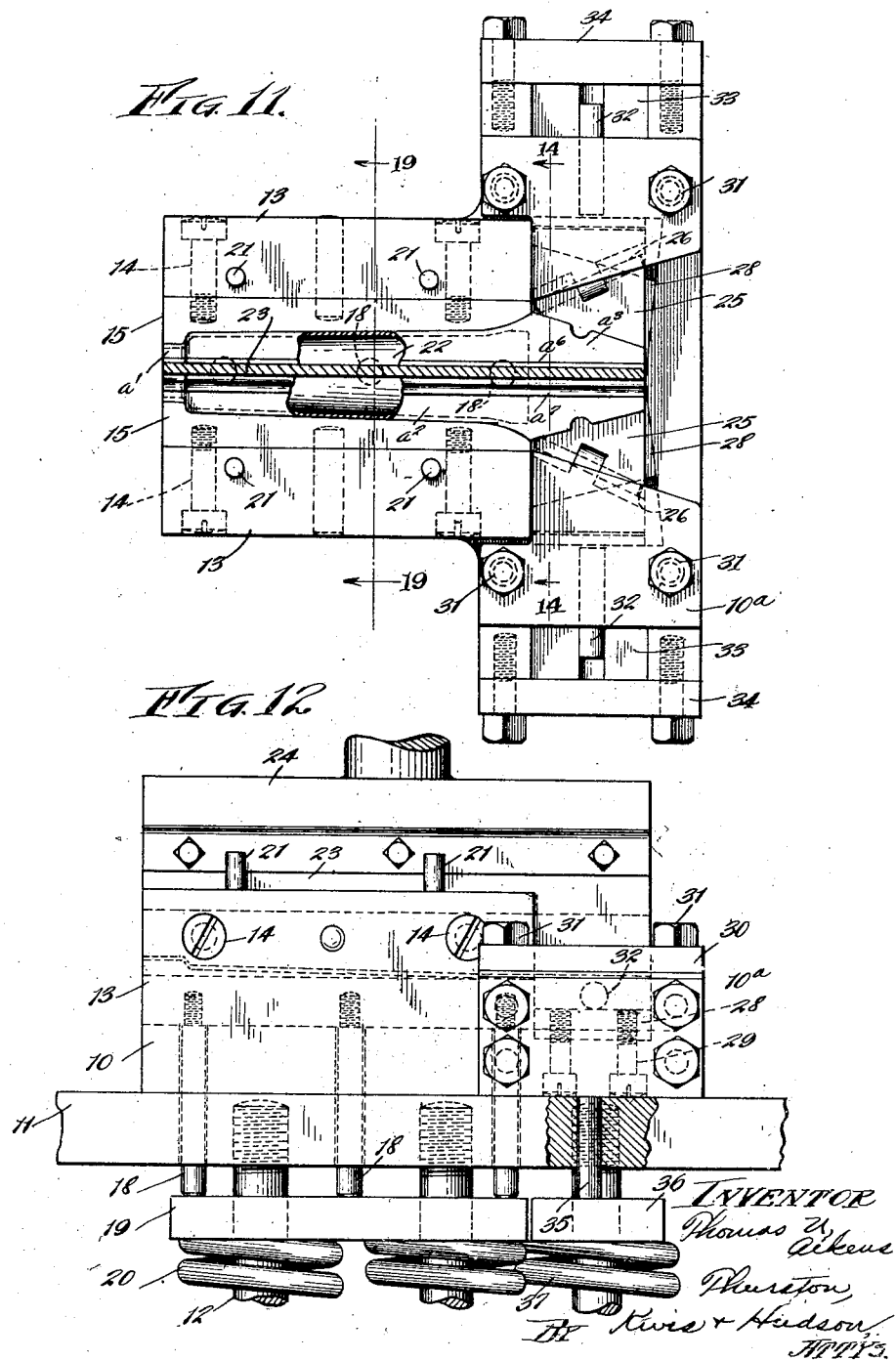

June 10, 1924. 1,497,006
T. N. AIKENS
DIE
Filed Sept. 12, 1921 6 Sheets-Sheet 4
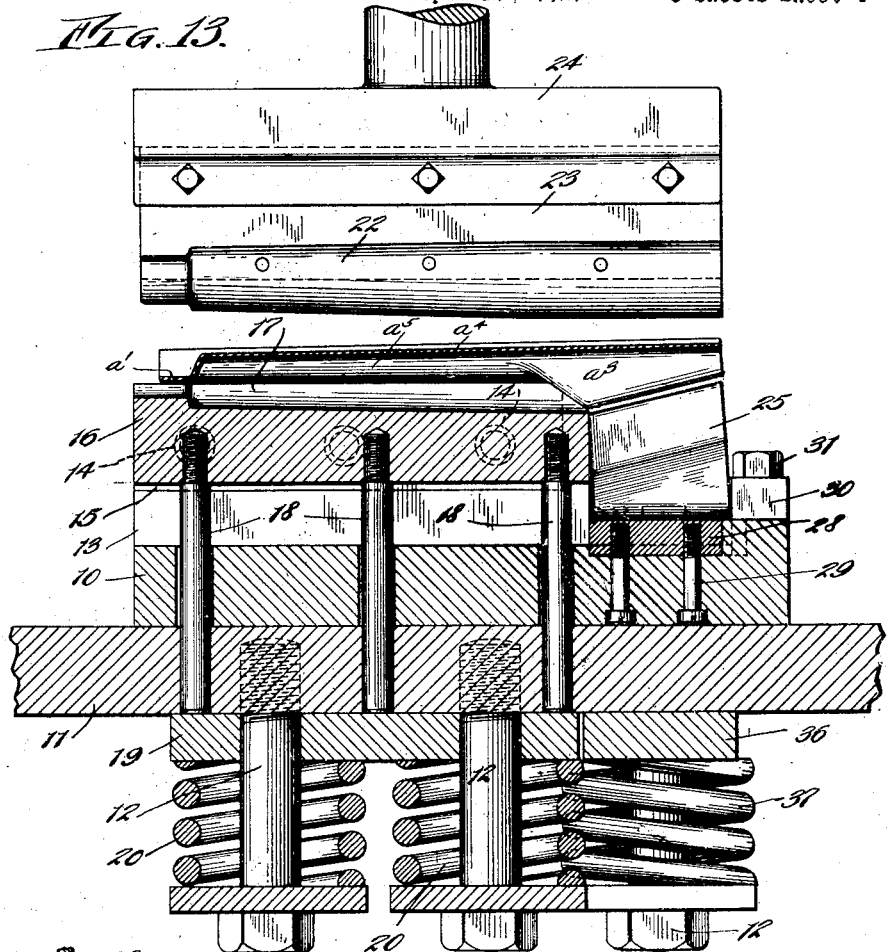

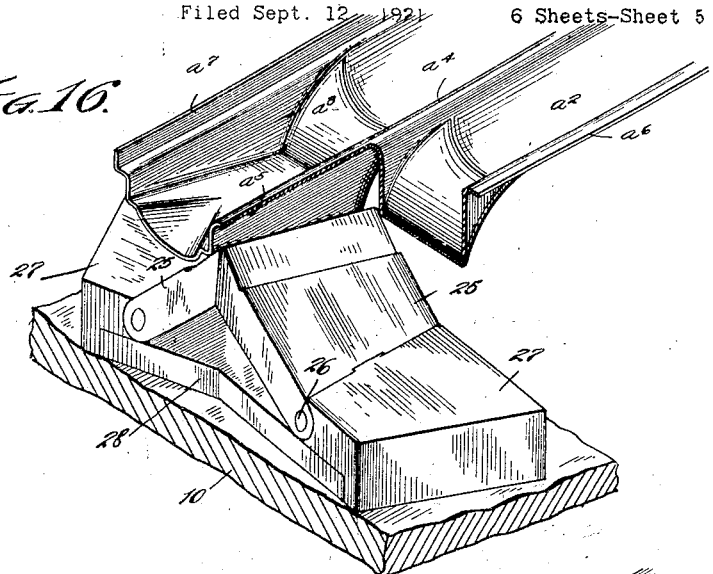
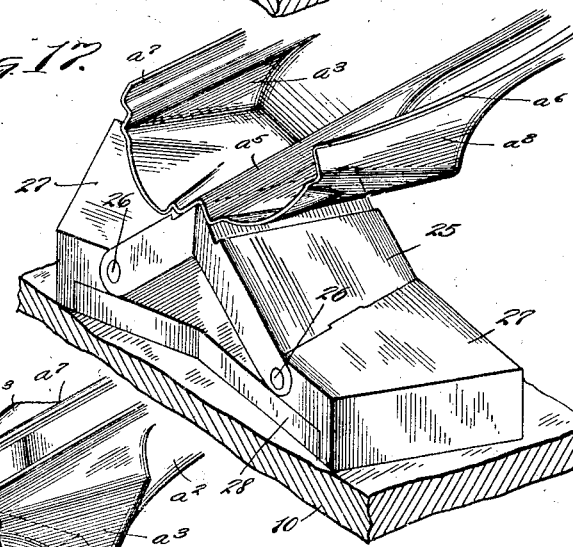
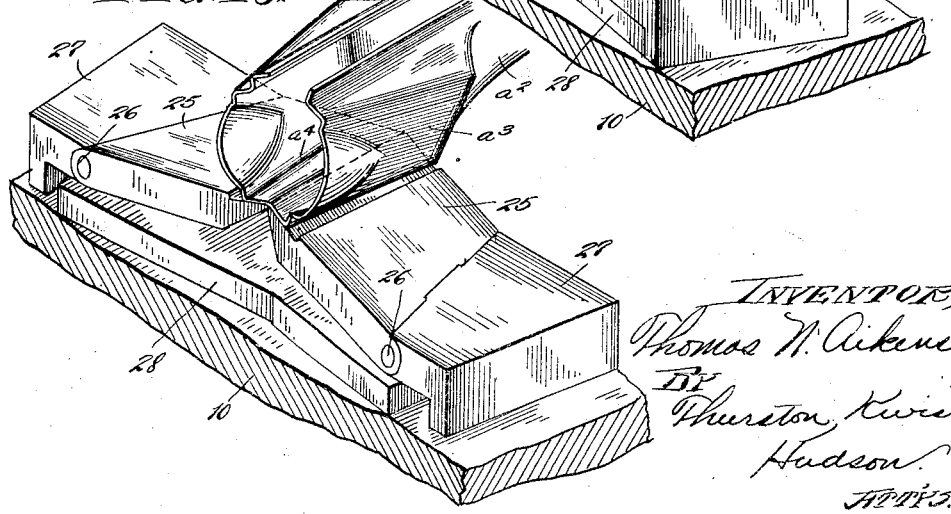

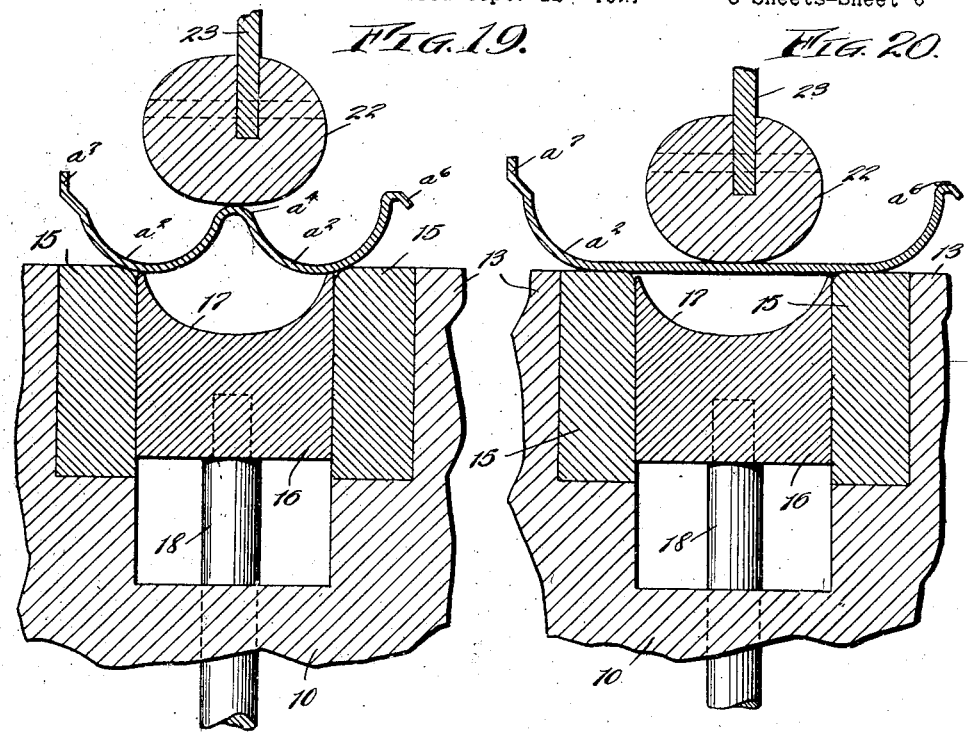
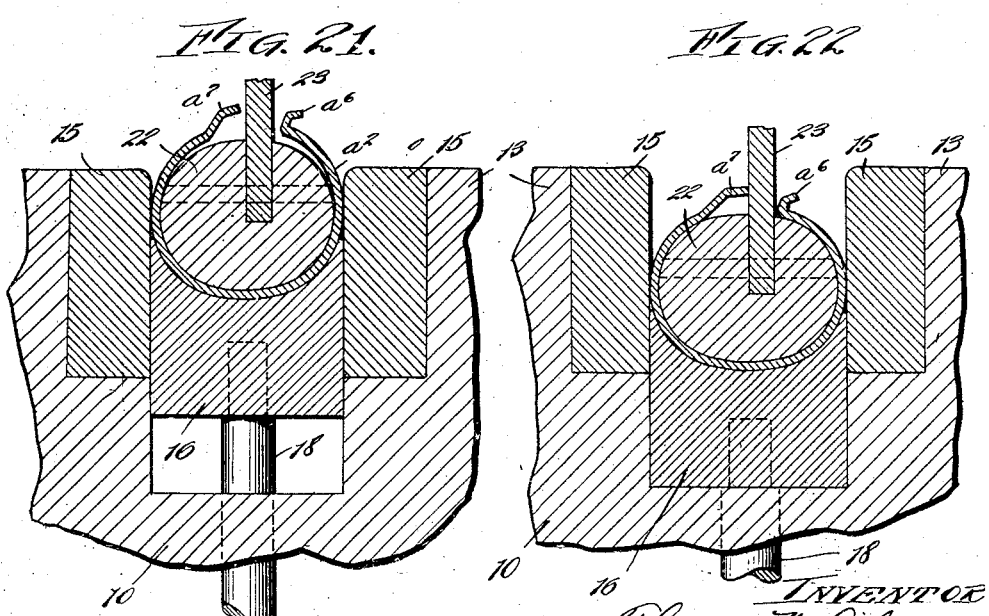

Patented June 10, 1924.

1,497,006

UNITED STATES PATENT OFFICE.

THOMAS N. AIKENS, OF LAKEWOOD, OHIO, ASSIGNOR OF ONE-HALF TO DAVID D. WALKER, OF LAKEWOOD, OHIO.

DIE.

Application filed September 12, 1921. Serial No. 500,000.

*To all whom it may concern:*

Be it known that I, THOMAS N. AIKENS, a citizen of the United States, residing at Lakewood, in the county of Cuyahoga and State of Ohio, have invented a certain new and useful Improvement in Dies, of which the following is a full, clear, and exact description.

This invention relates to certain new and useful improvements in dies.

In my copending application, Serial No. 487,292, filed July 25, 1921, I have described and claimed a tubular sheet metal spoke for vehicle wheels, the spoke being formed from one piece of sheet metal whose edges are locked together in a double seam extending the full length of the spoke, and the spoke being provided with a slightly tapered, substantially round body portion and with an enlarged wedge-shaped hub portion having two flat parallel faces adapted to be engaged by the flanges of the hub plates, and two tapered faces which are adapted to engage and to be interlocked with the similar faces of adjoining spokes.

By the preferred method of making the spoke described in a second copending application, Serial No. 496,373, filed Aug. 29, 1921, the spoke is produced from a properly shaped blank by several distinct steps or operations which include the shaping of the metal and the forming of the seam. In the first shaping operation following the punching of the blank, a partially formed spoke is produced consisting of two twin one-piece portions side by side, each conforming substantially to one-half the shape of the spoke, and united by an integral curved bridging wall forming on one side of the article a groove extending substantially the full length of the spoke and of considerable depth where it extends along or between the enlarged or wedge-shaped portions at the hub end. In the next forming operation this article is substantially closed and made to conform more nearly to the shape of the completed spoke.

The die constituting the subject matter of the present invention is used in the last mentioned forming operation, and the principal object is to provide a die which will operate on an irregularly shaped double or twin section such as referred to and will give the article the desired shape and substantially closed form effectively and quickly.

The invention may be briefly summarized as consisting in certain novel details of construction, and combinations and arrangements of parts which will be described in the specification and set forth in the appended claims.

Figure 2:
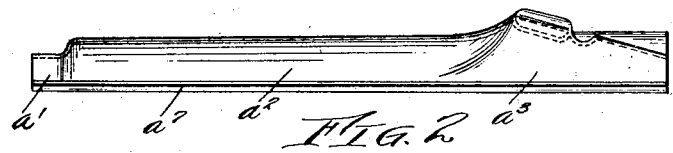
Figure 3:
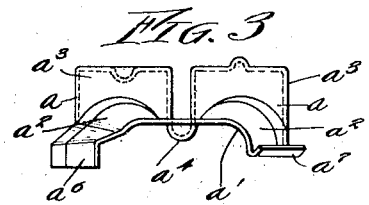
Figure 4:
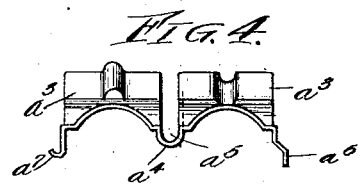
Figure 5:
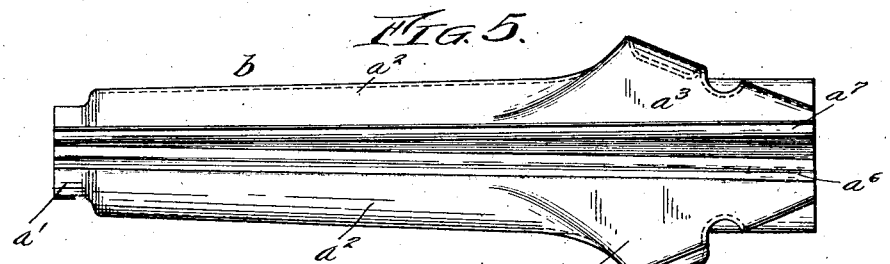
Figure 6:
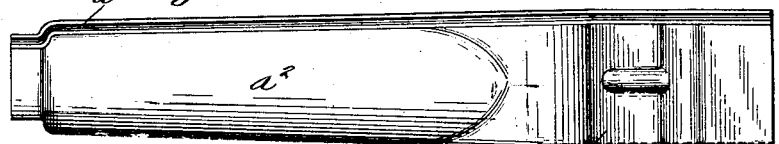
Figure 7:
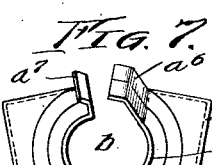
Figure 8:
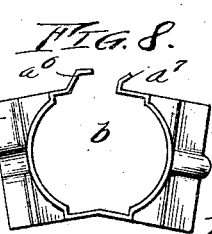

In the accompanying sheets of drawings, Fig. 1 is a plan view; Fig. 2 is a side view; Figs. 3 and 4 are end views looking at opposite ends of the partially formed spoke which is re-shaped or operated on by the die of the present invention; Figs. 5, 6, 7 and 8 are views corresponding to Figs. 1 to 4, showing the partially formed spoke after being operated on by the die of the present invention; Figs. 9 and 10 are end views of the die constituting the subject matter of this invention, the die being open in Fig. 9 and closed in Fig. 10; Fig. 11 is a horizontal sectional view substantially along the line 11—11 of Fig. 10, looking in the direction indicated by the arrows; Fig. 12 is a side view of the die in closed position; Fig. 13 is a vertical, longitudinal, sectional view of the die; Figs. 14, 15, are sectional views with portions omitted, the section being taken substantially along the line 14—14 of Fig. 11, looking in the direction indicated by the arrows, these views showing the action of certain movable forming plates which support the hub portions of the article or work during the forming operation; Figs. 16, 17 and 18 are fragmentary perspective views showing a portion of the work and three different positions of the forming plates at three stages of the forming or shaping operation; and Figs. 19, 20, 21 and 22 are transverse, sectional views omitting a certain portion substantially along the line 19—19 of Fig. 11, looking in the direction indicated by the arrows, the parts being shown on a slightly enlarged scale and illustrating the manner in which the body portions of the work or partially formed spoke are folded around to substantially closed position.

Before describing the construction of my improved die, reference is had to Sheet 1 of the drawings, of which Figs. 1 to 4 show the partially formed spoke before it is operated on by the die, and Figs. 5 to 8 show the partially formed spoke after being operated on. Referring to Figs. 1 to 4, it will be observed that the partially formed spoke (which is formed by a die forming no part of the present invention) consists of two halves, *a*, *a*, side by side, each including a felloe portion $a'$, a slightly tapered and substantially half round body portion $a^2$, and one-half of a wedge-shaped hub portion $a^3$, the two halves being formed in one piece and connected by a rounded bridging portion $a^4$, forming between the two halves a longitudinal slot $a^5$ which extends for the full length of the partially formed spoke except at the felloe end $a'$. The partially formed spoke has edge or marginal portions $a^6$ and $a^7$ designed to be locked together in the form of a seam by a die which forms no part of the present invention but is described and claimed in a co-pending application, Serial No. 499,354, filed Sept. 8, 1921.

The die of this invention takes the work or partly formed spoke shown in Figs. 1 to 4, and brings the two halves substantially together, producing the nearly closed spoke designated $b$ in Figs. 5 to 8, with the two body portions $a^2$ and the two hub portions $a^3$ facing each other in substantially their final relative position, and with the marginal portions $a^6$ and $a^7$ adjacent each other and in such relative position that in the next spoke forming operation they may be joined together and locked in the form of a seam.

The conversion of the work from the form shown in Figs. 1 to 4 to that shown in Figs. 5 to 8 without crushing the metal, particularly at the enlarged or hub portions where the slot $a^5$ is relatively deep, and without forming wrinkles in the metal, presented a difficult problem which is successfully solved by the die of this invention, which will now be described.

The die includes a lower die shoe 10, designed to be secured by dowel pins or otherwise, to the stationary part of the press, but in this instance to a bolster plate 11 which is usually bolted to the body of the press. In this instance, bolts 12 depend from the bolster plate to support springs and pressure plates to be referred to. The lower die shoe 10 is provided with two upstanding portions 13 which extend for the major portion of the length of the die shoe, as clearly shown in Figs. 11 and 12. These upstanding portions 13 are spaced apart, and on their inner faces are secured by screws 14, a pair of oppositely disposed forming plates 15 which are utilized in shaping the felloe end and the body portion of the spoke, the inner contour conforming substantially to the outline of these portions of the spoke, including a tapered portion leading up to the enlarged wedge-shaped hub end, as clearly shown in Fig. 11. The inner faces of these forming plates are spaced apart and are vertical or parallel to the direction of movement of the movable part of the die, and slidingly engaging their inner faces is a pressure pad 16 with a rounded upper face 17 conforming in outline to that portion of the lower part of the spoke (produced by this die) extending from the felloe end to the wedge-shaped hub portion of the spoke. The length of this pressure pad is equal to the length of the upstanding portion 13 of the die shoe and of the forming plates 15, as clearly shown in Figs. 11 and 13. This pressure pad is supported on a series of vertical pins 18, three being shown in this instance, which pins extend down through the bottom of the die shoe 10 and through the bolster plate 11. The lower ends of these pins engage the top of a plate 19, slidable on the bolster bolts 12 and yieldingly pressed upward by springs 20, the construction being such that the pressure pad is held yieldingly upward but may be depressed against the action of the springs 20 when pressed downward by the parts carried by the upper die shoe.

It might be mentioned at this point that the partially formed spoke of Figs. 1 to 4 is, prior to the forming operation of this die, placed on two pairs of guide pins 21 which project up from the upright portions 13 of the lower die shoe, these pins serving to centralize the work which is supported by these pins with the hollow or concave portion facing upwardly, and with the bridging wall or portion $a^4$ also standing upward and extending centrally and longitudinally of the depression between the forming plates 15.

Likewise it might be mentioned at this point that the work is pressed down onto the concave seat of the pressure pad and then both the work and the pressure pad are forced down between the forming plates 15, 15, as best illustrated in Figs. 19 to 22, by a tapered arbor 22, which moves vertically with the upper die member. This arbor 22 is secured by pins or otherwise, to a blade 23 which is secured in the slot of an upper die shoe 24 designed to be secured to the plunger of the press.

This arbor is slightly tapered, and conforms to the shape of the felloe and body portions of the spoke to be produced with this die, and though the felloe and body portions of the spoke are properly shaped by the action of this arbor with the co-operation of the pressure pad 16 and forming plates 15, and though the bottom of the arbor during its descent bears on the upstanding bridging portion $a^4$ of the work for the full length thereof, other means must be provided to support the enlarged hub portions of the work to bring these portions together and prevent the metal being crushed and wrinkled.

I therefore provide the following important parts which co-operate with the mandrel to shape or form the hub part of the spoke. At the end of the lower die shoe just beyond the upstanding portions 13 and beyond the pressure pad 16, I provide a pair of movable forming plates 25 which are beneath the enlarged hub portions of the work, or beneath that portion of the work projecting beyond the pressure pad when the work is placed on the guide pins 21 in the manner illustrated in Fig. 9. These forming plates normally project upward as shown in Figs. 9, 14, 16 and 17 with their tapered edges together, and with the top line of the V thus formed, adapted to project into the slot or groove $a^5$ of the work, these plates being so formed that this line is initially inclined and is parallel with the tapered faces of the hub end of the work at the start of the forming operation, as will be subsequently explained. The lower and outer ends of these forming plates are pivotally connected by diagonally disposed pins 26 to sliding blocks 27 which are adapted to slide laterally between a lower guide plate 28 secured to the die shoe 10 by screws 29, and upper cover plates 30 which are secured by screws or bolts 31 to the top of upstanding laterally disposed portions $10^a$ of the lower die shoe 10. The rear faces of the sliding blocks 27 are engaged by pins 32 extending horizontally through the portions $10^a$ of the die shoe 10, and their outer ends engage the upper tapered faces of vertically movable wedge blocks 33 adapted to slide up and down between the outer faces of the lateral portions $10^a$ of the die shoe and vertically disposed guide plates 34 which are secured to rib-like projections at the outer ends of the lateral portions $10^a$ of the die shoe. Secured to the lower portions of the wedge blocks 33 are pins 35 which project through the bolster plate 11 and engage the top of a transverse pressure plate 36 arranged at one end of the pressure plate 19 already referred to. This pressure plate 36 is yieldingly held upward by springs 37 surrounding certain of the bolster bolts 12.

The operation is as follows: The work is placed on the lower die shoe between the guide pins 21 as already explained, and as the arbor descends, it engages the center ridge $a^4$ of the work for its full length, depresses the metal at the center, bringing the half-round cup-shaped portions toward each other, and forcing the work into the rounded bottom of the pressure pad and down between the forming plates 15, the construction being such that when the pressure pad reaches the position shown in Fig. 22, the body portions of the work have been forced around the arbor with the free edges of the work engaging opposite sides of the blade on which the mandrel is supported. The forming operation for the body portion of the spoke is progressively illustrated in Figs. 19 to 22, Fig. 19 showing the early part of the action of the arbor; Fig. 20 showing the ridge flattened out and the metal about to be forced down between the forming plates 15; Fig. 21 showing the metal forced down into the pressure pad and the latter partly lowered: and Fig. 22 showing the completion of the stroke with the metal enveloping the arbor.

At the same time that the arbor with the co-operation of the forming plates 15 and pressure pads 17 shape the felloe and body portions of the spoke, the hub portion is shaped by the arbor and the forming plates 25. When the arbor first engages the ridge at the center of the work, the forming plates 25 are in the form of a V, as already explained, with the top portions or the top line of the V projecting into the lower part of the groove $a^5$ as shown in Fig. 16. Then as the arbor descends, the hub portions are driven down onto the forming plates 25, and the two hub portions are spread or rotated until they bear solidly against the faces of the two forming plates and until the outer end of the top line of the V or wedge engages the metal at the base of the groove $a^5$. Up to this point the forming plates 25 were not lowered, and the parts are in the position shown in Fig. 17. Further downward movement of the arbor results in the lowering of the top of the wedge formed by the forming plates and the lateral or outward movement of the lower portions of these plates, or a flattening of the V as illustrated in Fig. 18. This causes a further rotation of the hub portions of the work until finally the forming plates rest upon the guide plate 28 as shown in Fig. 15, thus completing the rotation of the hub portions of the work, bringing the marginal edges along the hub portions on opposite sides of the blade 23 supporting the arbor. This takes place simultaneously with the final movement of the pressure pad to the position shown in Fig. 22.

The flattening of the V formed by the forming plates 25 is resisted by the springs opposing the downward movement of the wedge blocks 33, and in consequence the work is at all times held down solidly against the forming plates while the V formed by the forming plates is being spread or flattened. These forming plates by engaging with the hub portions thus prevent crushing of the metal at the hub end of the work by the pressure of the arbor, and at the same time prevent wrinkling of the metal in that portion thereof which is being substantially flattened out between the arbor and the forming plates. It is to be noted that after the final movement of the arbor to the position shown in Fig. 15, the bottom face of the hub end of the work is not horizontal, but tapers slightly from the center in opposite directions, this being desired by reason of the fact that the edge or marginal portions of the work are spaced apart equal to the width of the blade supporting the arbor. The bottom of the work at the hub end is made to assume this configuration by appropriately slotting or grooving at the proper angle, the outer faces of the forming plates 25 for a distance down from their free edges.

The shape of the forming plates and the manner of connecting them on diagonally disposed axes to the sliding blocks 27 produce a peculiar action which is very important to the rotation of the wedge-shaped hub portions of the work and the proper forming or shaping of said portions. By having the outer edges of these plates, as viewed in Figs. 16, 17 and 18, longer than the inner edges, the top line of the V is inclined in conformity with the inclination of the inclined bottom faces of the hub portions, so that as the work is depressed onto the V or wedge formed by the upper portions of these forming plates, the wedge enters uniformly between the hub portions for the full length thereof, producing a uniform spreading action as is desired, though when the outer end of the top line of the wedge engages the base of the outer end of the groove $a^5$ of the work, the top line of the wedge is still inclined with reference to the top line of the center ridge of the work. Furthermore, by pivoting the outer portions of the forming plates to the sliding blocks on diagonally disposed axes, further downward movement of the arbor and work from the position shown in Fig. 17 to the final downward position during which the forming plates are flattened out, the top line of the wedge gradually approaches and finally assumes a horizontal position so that at the instant of final closing movement of the die, the top line of the wedge bears against the metal for the full length of the hub portions so that the forming plates with the pressure pad form or produce a support for the full length of the spoke and for the full length of the arbor.

To permit this action as the forming plates are being flattened down, the sliding blocks 27 and the outer portions of the forming plates connected thereto, swing inward or away from the observer as the parts are viewed in Figs. 16, 17 and 18, this being necessary, as is apparent, for the reason that the outer edges of the forming plates swing through an arc of a longer radius than the inner edges. The lower guide plate 28, the top guide or holding plate 30, and the space between the plates are so formed as to permit this movement, i. e. the combined inward swinging movement of the sliding blocks 27 and outer lateral movement.

Immediately after the completion of the downward stroke of the arbor the latter ascends, carrying with it the work which now has assumed the form of the partially completed spoke designated $b$, and illustrated in Figs. 5 to 8. It is now only necessary to strip the spoke $b$ from the arbor, whereupon the cycle is repeated with another piece to be operated on.

Having described my invention, I claim—

1. A spoke forming die for bringing to substantially spoke form two integral half spoke sections joined by a longitudinal center ridge comprising relatively movable members including a pressure applying device and a bed having a pair of forming plates yieldably mounted thereon and having their adjacent edges normally held above the remainder thereof whereby they are adapted to enter between portions of the half sections so as to spread them.

2. A forming die for bringing together two integral half sections of a metal piece separated by a longitudinally extending groove in a central hollow ridge, comprising a part which engages the ridge and a bed having a pair of substantially flat forming plates normally yieldingly held in V formation thereon and adapted to enter the groove and to be flattened upon the bed so as to spread the half sections when pressure is applied.

3. A forming die for bringing together two integral half sections of a metal piece separated by a longitudinally extending groove in a central hollow ridge, comprising relatively movable members including a part adapted to apply pressure to the ridge, a pair of forming plates normally in V formation and arranged with the line of the V opposite said pressure applying part, and a pair of sliding members which the outer portions of the plates engage.

4. A forming die for bringing together two integral half sections of a metal piece separated by a longitudinally extending groove in a central hollow ridge, comprising relatively movable members including a part adapted to apply pressure to the ridge, a pair of forming plates normally in V formation and arranged with the line of the V opposite said pressure applying part, and a pair of sliding plates to which the outer portions of the forming plates are pivotally connected.

5. A forming die for bringing together two integral half sections of a metal piece separated by a longitudinally extending groove in a central hollow ridge, comprising relatively movable members including a part adapted to apply pressure to the ridge, a pair of forming plates normally in V formation and arranged with the line of the V opposite said pressure applying part, and a pair of laterally slidable plates to which the outer portions of the forming plates are pivotally connected on diagonally disposed axes.

6. A forming die for bringing together two integral half sections of a metal piece separated by a longitudinally extending groove in a central hollow ridge, comprising relatively movable members including a part adapted to engage and apply pressure to the ridge, a pair of forming plates normally arranged in the form of a V, with the upper line thereof opposite the pressure applying part and diagonally disposed with the adjacent surface thereof, the outer portions of said forming plates being connected to lateral oppositely movable abutments.

7. A forming die for bringing together two integral half sections of a metal piece separated by a longitudinally extending groove in a central hollow ridge, comprising relatively movable members including a part adapted to engage and apply pressure to the ridge, a pair of forming plates normally arranged in the form of a V, with the line thereof opposite the pressure applying part and diagonally disposed with respect to the adjacent surface thereof, the outer portions of said forming plates being connected to lateral oppositely movable abutments on lines diagonally disposed with reference to the longitudinal axis of the die.

8. In a spoke forming die for bringing substantially to spoke form a metal piece having two integral half spoke sections with wedge-shaped hub portions at one end, with sections separated by a longitudinally extending groove in a central hollow ridge, comprising relatively movable members including a part adapted to engage and apply pressure to the ridge, and parts co-operating therewith and including means for revolving and swinging toward each other the body portions of the half sections, and additional means for revolving the hub portions of the sections, said last mentioned means being mounted for movement independently of said first mentioned means.

9. In a spoke forming die for bringing to substantially spoke form two integral half spoke sections separated by a longitudinally extending groove in a hollow ridge, the sections having body portions and enlarged wedge-shaped hub portions, comprising relatively movable parts including a part adapted to engage and apply pressure to the ridge, forming means co-operating therewith for revolving the half sections toward each other and including parts for revolving the body portions, and separate parts for revolving the hub portions, said hub portion engaging parts being mounted for movement independently of the body portion engaging parts.

10. In a spoke forming die for bringing to substantially spoke form two integral half spoke sections separated by a longitudinally extending groove in a hollow ridge, the sections having body portions and enlarged wedge-shaped hub portions, comprising relatively movable parts including a part adapted to engage and apply pressure to the ridge, forming means cooperating therewith for revolving the half sections toward each other and including parts for revolving the body portions and separate parts for revolving the hub portions, the first mentioned parts including fixed forming plates, and a pressure pad between the same.

11. In a spoke forming die for bringing to substantially spoke form two integral half spoke sections separated by a longitudinally extending groove in a hollow ridge, the sections having body portions and enlarged wedge-shaped hub portions, comprising relatively movable parts including a part adapted to engage and apply pressure to the ridge, forming means co-operating therewith for revolving the half sections toward each other and including parts for revolving the body portions and separate parts for revolving the hub portions, the second mentioned parts comprising a pair of forming plates normally arranged in the form of a V and adapted to enter the groove between the hub portions and to be gradually flattened as pressure is applied.

12. In a spoke forming die for bringing to substantially spoke form two integral half spoke sections separated by a longitudinally extending groove in a hollow ridge, the sections having body portions and enlarged wedge-shaped hub portions, comprising relatively movable parts including a part adapted to engage and apply pressure to the ridge forming means co-operating therewith for revolving the half sections toward each other and including parts for revolving the body portions and separate parts for revolving the hub portions, the first mentioned parts including a pair of spaced forming plates with a yieldable pressure pad between the same, and the second mentioned parts including a pair of forming plates normally arranged in the form of a V with the center line thereof in the plane of the center line of the pressure pad, and arranged so that they may gradually flatten as pressure is applied.

13. In a spoke forming die for bringing to substantially spoke form two integral half spoke sections separated by a longitudinally extending groove in a hollow ridge, the sections having body portions and enlarged wedge-shaped hub portions, comprising a member adapted to engage and apply pressure to the ridge, forming means co-operating therewith for revolving the half sections toward each other and including parts for revolving the body portions and separate parts for revolving the hub portions, the first mentioned parts comprising a pair of forming plates a fixed distance apart, a yieldable pressure pad between the same and arranged opposite the pressure applying member, and the second mentioned parts including a pair of pressure plates arranged in the form of a V with the line or apex thereof opposite the pressure applying member and in the plane of the center line thereof, and a pair of laterally movable abutments to which the outer portions of said forming plates are pivotally connected.

14. In a spoke forming die for bringing to substantially spoke form two integral half spoke sections separated by a longitudinally extending groove in a hollow ridge, the sections having body portions and enlarged wedge-shaped hub portions, comprising a member adapted to engage and apply pressure to the ridge, forming means cooperating therewith for revolving the half sections toward each other and including parts for revolving the body portions and separate parts for revolving the hub portions, the first mentioned parts comprising a pair of forming plates a fixed distance apart, a yieldable pressure pad between the same and arranged opposite the pressure applying member, and the second mentioned parts including a pair of pressure plates arranged in the form of a V with the line or apex thereof opposite the pressure applying member and in the plane of the center line thereof, and a pair of laterally movable abutments to which the outer portions of said forming plates are pivotally connected on diagonally disposed axes, means yieldably opposing the movement of the pressure pad, and means yieldingly opposing the lateral movement of said abutments.

In testimony whereof, I hereunto affix my signature.

THOMAS N. AIKENS.